3,164,942
FRUIT HARVESTER HAVING GATHERING FINGERS

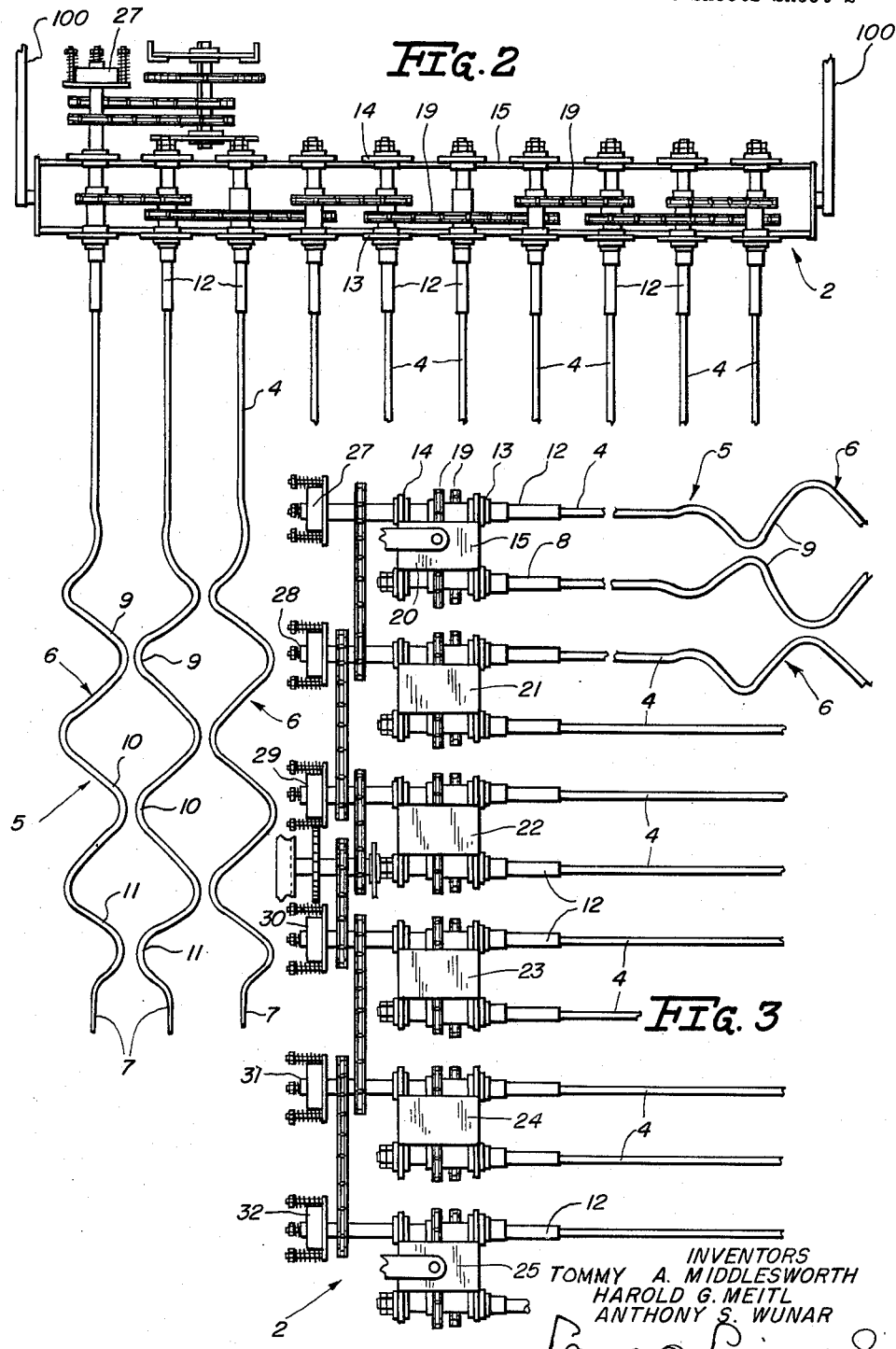

Tommy A. Middlesworth and Harold G. Meitl, Hinsdale, and Anthony S. Wunar, Chicago, Ill., assignors to International Harvester Company, Chicago, Ill., a corporation of New Jersey
Filed Aug. 3, 1962, Ser. No. 214,657
3 Claims. (Cl. 56—328)

This invention relates to fruit harvesters, and more specifically though not necessarily limited to a harvester for oranges and the like.

The instant invention constitutes, improvements over the invention shown and described in the pending applications of Fred V. Laswell, Serial No. 747,275 filed July 8, 1958, and Serial No. 36.448 filed June 15, 1960, now Patent No. 3,040,507.

In harvesters of the type under consideration it is desirable to provide a machine having a picker head comprising a plurality of fingers geometrically arranged in order to cover a preset picking area. The structure under consideration comprises a plurality of side-by-side arranged fingers or spindles which are carried from a panel, the fingers being adapted to be advanced into a tree and pursuant to rotation of the spindles to auger into the tree and then the fingers to be withdrawn to strip the fruit off the plant.

A companion application of ours, Serial No. 214,601, illustrates and covers the provision of resilient picker fingers of corkscrew shape. This predecessor invention, although operating successfully in general, sometimes has developed the problem of having the fingers entwine with each other so that they were difficult to extricate from the tree without breaking branches and the like. Such entwinement of the helical shaped fingers also posed the problem of unwrapping the fingers and this at times could be accomplished by reversely rotating the fingers so that they would separate.

The instant invention contemplates an improvement in so arranging the fingers with their helical convolutions so that adjacent fingers oppose each other along their crests and thus the tendency to wrap with each other is substantially eliminated.

The invention also contemplates a novel arrangement of picker fingers or spindles in groups of four, and these groupings being so arranged that the turns of the helicoidal portions of the fingers present opposing convex portions in transverse alignment with each other such that if the adjacent finger should for some reason be brought into engagement with each other, they will engage each other along opposing peripheral helical surfaces and thus be prevented from entering the convolutions of each other.

A general object of the invention is to provide a novel fruit picker head comprising a plurality of side-by-side arranged picker spindles each of helical configuration wherein the spindles are so arranged that adjacent spindles oppose each other along areas paralleling the axes of rotation of the spindles in the line of tangency along their peripheries.

A more specific object of the invention is to provide a novel picker head comprising a plurality of side-by-side arranged helical spindles wherein the adjacent spindles are so positioned so that they engage each other at their peripheries and prevent the entry of the convolutions of one spindle from entering into those of the other spindle.

These and other objects of the invention will become more apparent from the specification and the drawings, wherein:

FIG. 2 is a plan view of the picker head with portions removed to clarify the illustration; and FIG. 3 is a side elevational view of the structure shown in FIG. 2 with the shield removed.

Figure 1:
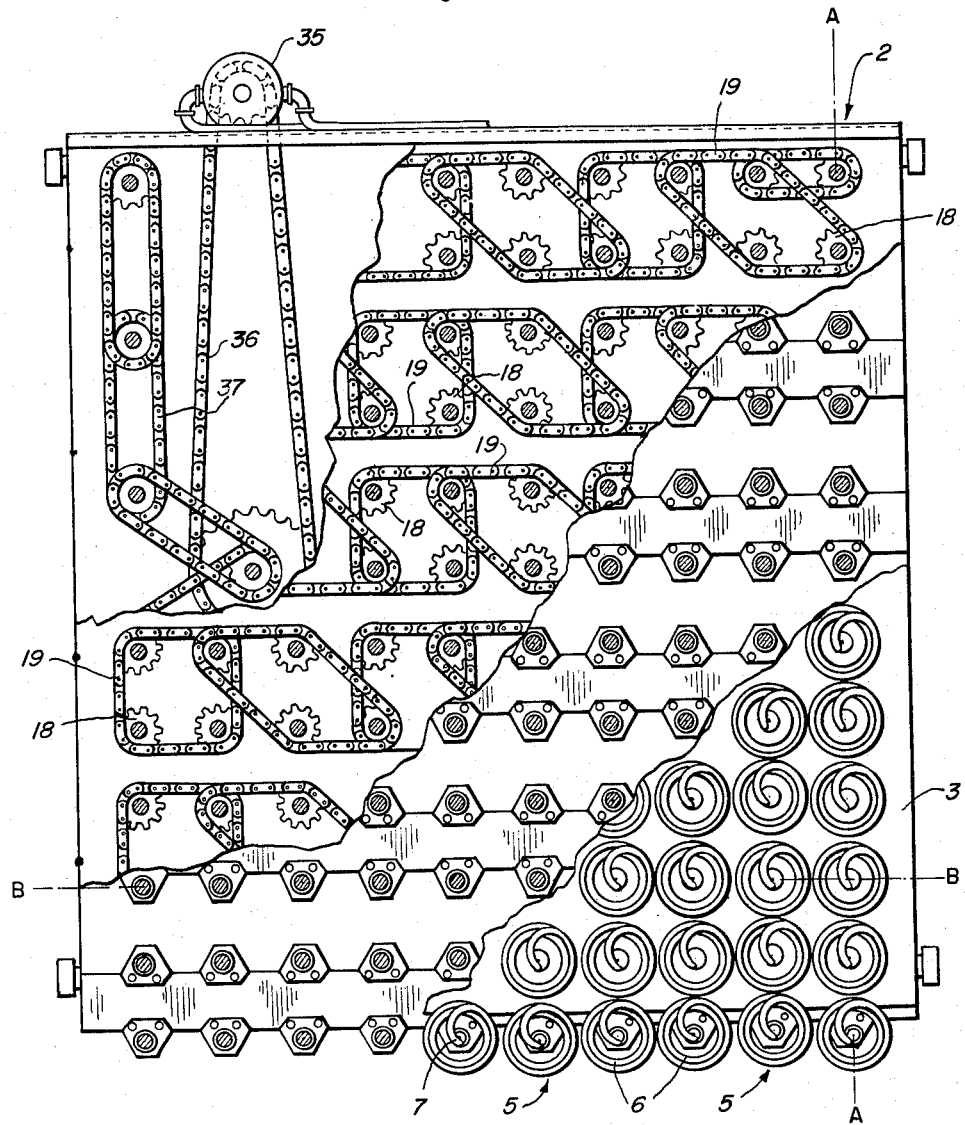
FIG. 1 is a front view of the picker head with portions of the head broken away from front to rear to illustrate the mechanism behind each portion.

Describing the invention in detail and having particular reference to the drawings, there is shown a picker head generally designated 2 which comprises a substantially square panel structure including a forward panel shield 3 through which project the root ends 4 of the picker spindles or fingers generally indicated 5, said spindles 5 being arranged in vertically aligned rows indicated by the line AA and horizontal rows indicated by the lines BB. It will be seen that the picker fingers are thus arranged in a square grid fashion and that each picker finger is preferably made of spring steel, and in addition to the axially extending root end portion 4 comprises a spiral portion generally designated 6 which proceeding from the root end 4 to the outer pointed free end 7 which is coaxial with the root end portion 4 comprises the following convolutions. The innermost coil of the helical portion 6 recedes from the root end 4 270° in 12 inches and is followed by two turns of 360° in 10 inches, followed by a 180° turn in five inches, followed by a 180° turn in seven inches which merges into the three inch length straight tip 7. Thus it will be seen that the coil pitch is extended toward the outer end. In our construction the spindle used was 86 inches in overall length with a 6 inch overall diameter throughout the length of the coil portion 6. Adjacent spindles are spaced 6.30 inches horizontally and vertically so that there are clearances between adjacent convolutions. The spindles are disposed in timed relation with each other so that the crest 9—9, 10—10, 11—11 of adjacent spindles always oppose each other whereby if either or both spindles should be deflected transversely or laterally they will engage each other in the region of the crests and the adjacent convolutions of one spindle will be prevented from entering into the convolutions of the other spindle.

In order to insure such relationship between the adjacent spindles, which are formed of spring steel and of course are laterally or transversely deflectable, the root end portions 4 of the spindles are mounted within the supports 12 which are journaled in bearings 13 and 14 in the supports or framework 15. It will be seen that the spindles are suitably driven in timed relation with each other by means of the chain and sprocket elements 18 and 19 and that each bank of spindles 20, 21, 22, 23, 24 and 25 is driven through the single revolution clutch mechanisms 27, 28, 29, 30, 31 and 32 to insure the timed relation between adjacent banks of spindles upon any spindle in any bank being obstructed so that those spindles in that particular bank are prevented from rotating except in timed relation with each other.

It will be seen that the drive is initiated to the respective clutch controlled driving trains from a motor 35 which is preferably a hydraulic unit as well known to those skilled in the art, said motor 35 being suitably coupled through chain and sprocket drive transmission 36 and 37 to the respective clutches, as will be readily apparent from FIGS. 1, 2 and 3.

Having described the invention, it will be readily apparent that slight deviations may be made without affecting the spirit of the invention as covered by the appended claims.

What is claimed is:
1. A fruit picker comprising a picker head having a plurality of rotatable side-by-side picker spindles formed of material permitting the spindles to deflect laterally against one another, said spindles having helical portions in transverse alignment with each other, and means rotating said spindles in timed relation with one another in preset relation with said helical portions abutting under deflection of the spindles along the turns of the helix.

2. A fruit picker head comprising a plurality of steel wire picker spindles, each spindle having straight coaxial root and outer end portions and an intermediate helical portion, said spindles disposed in side-by-side relation with the helical convolutions opposing each other transversely thereof.

3. In a fruit picker head, a panel structure, a plurality of spindles rotatably supported thereon and extending substantially normal thereto, and each said spindle being formed of steel wire and having an inner generally straight end portion and a helical portion extending outwardly from said end portion and said wire tapered outwardly.

References Cited in the file of this patent

UNITED STATES PATENTS

| | | |
|---|---|---|
| 350,702 | Schellhorn | Oct. 12, 1886 |
| 423,541 | Todd | Mar. 18, 1890 |
| 3,040,507 | Lasswell | June 26, 1962 |
| 3,077,720 | Grove et al. | Feb. 19, 1963 |